US009563239B2

(12) United States Patent
Nguyen et al.

(10) Patent No.: US 9,563,239 B2
(45) Date of Patent: Feb. 7, 2017

(54) INTERNAL COMPUTER ASSEMBLY FEATURES AND METHODS

(75) Inventors: Anthony Pham Nguyen, San Jose, CA (US); Laura M. DeForest, San Mateo, CA (US); Michelle Goldberg, Sunnyvale, CA (US); Stephen Vincent Jayanathan, Oakland, CA (US); Kevin Scott Fetterman, Los Altos, CA (US); James M. Cuseo, Los Altos, CA (US); Joshua Ryan Funamara, San Jose, CA (US)

(73) Assignee: Apple Inc., Cupertino, CA (US)

( * ) Notice: Subject to any disclaimer, the term of this patent is extended or adjusted under 35 U.S.C. 154(b) by 758 days.

(21) Appl. No.: 13/608,839

(22) Filed: Sep. 10, 2012

(65) Prior Publication Data

US 2014/0071611 A1    Mar. 13, 2014

(51) Int. Cl.
*G06F 1/16*        (2006.01)
*G06F 1/18*        (2006.01)

(52) U.S. Cl.
CPC ............... *G06F 1/187* (2013.01); *G06F 1/183* (2013.01)

(58) Field of Classification Search
CPC ..................................................... G06F 1/187
USPC .... 361/679.01–679.39, 724–727; 312/223.1, 312/223.2
See application file for complete search history.

(56) References Cited

U.S. PATENT DOCUMENTS

| | | |
|---|---|---|
| 3,883,861 A | 5/1975 | Heartz |
| 4,369,439 A | 1/1983 | Broos |
| 4,506,354 A | 3/1985 | Hansen |
| 5,010,536 A | 4/1991 | Wanger et al. |
| 5,059,959 A | 10/1991 | Barry |
| 5,317,105 A | 5/1994 | Weber |
| 5,342,991 A | 8/1994 | Xu et al. |
| 5,664,292 A | 9/1997 | Chen |
| 5,770,898 A | 6/1998 | Hannigan et al. |
| 5,959,612 A | 9/1999 | Breyer et al. |
| 5,975,953 A | 11/1999 | Peterson |
| 6,130,663 A | 10/2000 | Null |
| 6,198,470 B1 | 3/2001 | Agam et al. |
| 6,216,999 B1 * | 4/2001 | Olson ................... G06F 1/1601 248/694 |
| 6,310,769 B1 | 10/2001 | Johnson et al. |

(Continued)

FOREIGN PATENT DOCUMENTS

| | | |
|---|---|---|
| CN | 201898231 | 7/2011 |
| JP | 58112263 | 7/1983 |

(Continued)

*Primary Examiner* — Nidhi Thaker
(74) *Attorney, Agent, or Firm* — Zachary D. Hadd

(57) ABSTRACT

Examples of computing devices and assemblies for mounting computer components to an enclosure or other structure of the computing device are described. In some examples, the mounting assembly may include a compliant member having a plurality of corner portions configured to engage the corners of the component. The mounting assembly may also include a bracket configured to enclose at least a portion of the compliant member. The mounting bracket may be configured to mount the component at an angle relative to the enclosure or other structure, and may include one or more features adapted for improved cooling of the component mounted therein. The compliant member may include a plurality of ribs or other retaining elements for maintaining the component in a spaced apart position relative to the mounting bracket.

22 Claims, 12 Drawing Sheets

(56) References Cited

U.S. PATENT DOCUMENTS

| | | |
|---|---|---|
| 6,313,825 B1 | 11/2001 | Gilbert |
| 6,337,678 B1 | 1/2002 | Fish |
| 6,429,846 B2 | 8/2002 | Rosenberg et al. |
| 6,519,138 B1* | 2/2003 | Olson ............ G06F 1/1601 |
| | | 361/679.22 |
| 6,713,672 B1 | 3/2004 | Stickney |
| 6,800,805 B2 | 10/2004 | Deguchi |
| 6,987,466 B1 | 1/2006 | Welch et al. |
| 7,075,793 B2 | 7/2006 | Le et al. |
| 7,113,196 B2 | 9/2006 | Kerr |
| 7,125,287 B1 | 10/2006 | Chou et al. |
| 7,222,753 B2 | 5/2007 | Hayduk |
| 7,280,353 B2 | 10/2007 | Wendel et al. |
| 7,345,677 B2 | 3/2008 | Ing et al. |
| 7,411,581 B2 | 8/2008 | Hardie-Bick |
| 7,470,862 B2 | 12/2008 | Lin et al. |
| 7,470,866 B2 | 12/2008 | Dietrich et al. |
| 7,473,139 B2 | 1/2009 | Barringer et al. |
| 7,499,286 B2 | 3/2009 | Berke et al. |
| 7,511,711 B2 | 3/2009 | Ing et al. |
| 7,575,481 B1 | 8/2009 | Liu |
| 7,620,316 B2 | 11/2009 | Boillot |
| 7,656,393 B2 | 2/2010 | King et al. |
| 7,710,397 B2 | 5/2010 | Krah et al. |
| 7,725,288 B2 | 5/2010 | Boillot |
| 7,834,855 B2 | 11/2010 | Hotelling et al. |
| 7,844,310 B2 | 11/2010 | Anderson |
| 7,845,953 B2 | 12/2010 | Brock et al. |
| 7,852,369 B2 | 12/2010 | Cutler et al. |
| 7,884,315 B2 | 2/2011 | Andre et al. |
| 7,924,175 B2 | 4/2011 | Gitzinger et al. |
| 8,067,701 B2 | 11/2011 | Keiper et al. |
| 8,098,233 B2 | 1/2012 | Hotelling et al. |
| 8,110,744 B2 | 2/2012 | Wong et al. |
| 8,204,561 B2 | 6/2012 | Mongan et al. |
| 8,341,217 B2 | 12/2012 | Miyazaki et al. |
| 8,441,790 B2 | 5/2013 | Pance et al. |
| 8,913,377 B2* | 12/2014 | Furuta ............ H05K 7/1489 |
| | | 361/679.33 |
| 2004/0114321 A1* | 6/2004 | Roh ............ G06F 1/184 |
| | | 361/679.32 |
| 2004/0129515 A1* | 7/2004 | Murakami ............ F16F 9/30 |
| | | 188/267.2 |
| 2004/0238195 A1 | 12/2004 | Thompson |
| 2006/0082518 A1 | 4/2006 | Ram |
| 2006/0197753 A1 | 9/2006 | Hotelling |
| 2007/0263351 A1* | 11/2007 | Ho ............ G06F 1/1613 |
| | | 361/679.33 |
| 2007/0268661 A1* | 11/2007 | Wobig ............ G06F 1/187 |
| | | 361/679.33 |
| 2008/0103637 A1 | 5/2008 | Bliven et al. |
| 2009/0002328 A1 | 1/2009 | Ullrich et al. |
| 2009/0052715 A1 | 2/2009 | Zhang et al. |
| 2009/0173533 A1 | 7/2009 | Brock et al. |
| 2009/0244836 A1 | 10/2009 | Leng et al. |
| 2009/0296340 A1* | 12/2009 | Dozier ............ G11B 33/121 |
| | | 361/679.36 |
| 2010/0122439 A1 | 5/2010 | Britton et al. |
| 2010/0301755 A1 | 12/2010 | Pance et al. |
| 2010/0306683 A1 | 12/2010 | Pance et al. |
| 2011/0037624 A1 | 2/2011 | Pance et al. |
| 2011/0037734 A1 | 2/2011 | Pance et al. |
| 2011/0038114 A1 | 2/2011 | Pance et al. |
| 2011/0043227 A1 | 2/2011 | Pance et al. |
| 2011/0102991 A1 | 5/2011 | Sullivan et al. |
| 2011/0119973 A1 | 5/2011 | Andre et al. |
| 2011/0175813 A1 | 7/2011 | Sarwar et al. |
| 2013/0135796 A1 | 5/2013 | Auclair et al. |

FOREIGN PATENT DOCUMENTS

| | | |
|---|---|---|
| JP | 2002207985 | 7/2002 |
| WO | WO2005/083547 | 9/2005 |
| WO | WO2007/083894 | 7/2007 |

* cited by examiner

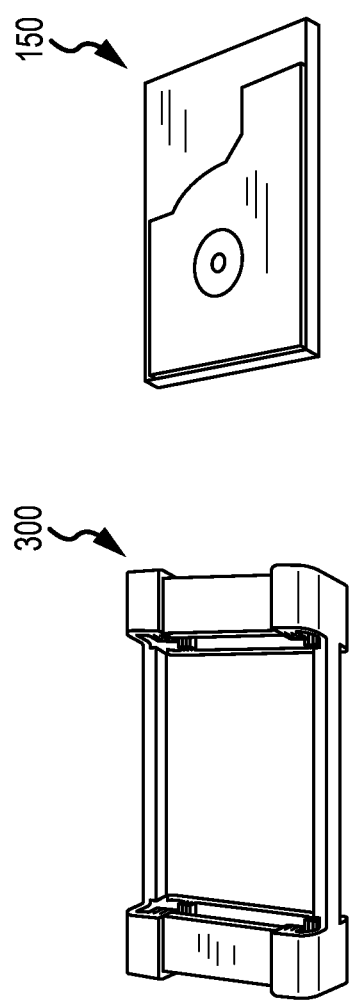

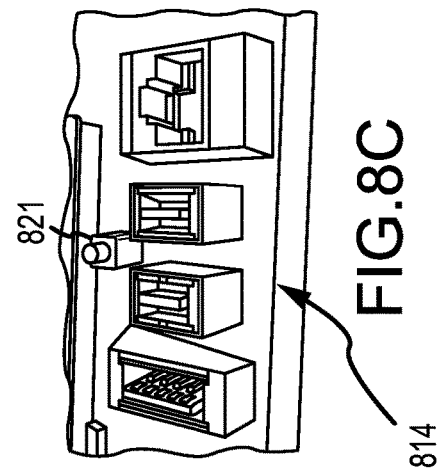
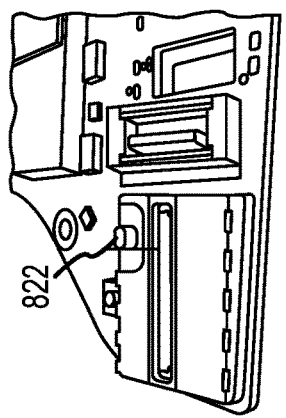
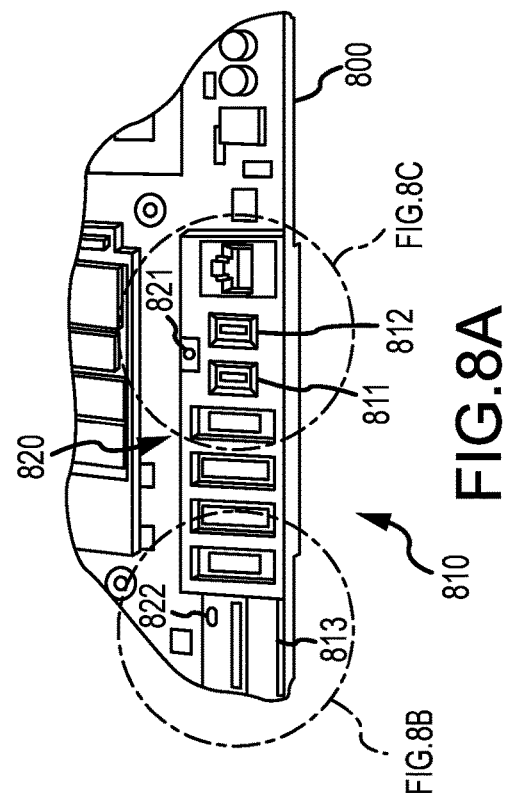

US 9,563,239 B2

INTERNAL COMPUTER ASSEMBLY FEATURES AND METHODS

TECHNICAL FIELD

The present disclosure relates generally to internal computer assembly features and methods. Examples of systems and methods for mounting vibration sensitive computer components to a computer enclosure are described, as well as examples for simplified and efficient locating of internal components during assembly.

BACKGROUND

Computing devices generally include numerous internal components such as memory, storage devices (e.g. disk or solid state drives), processors, thermal management devices, and various input/output (I/O) circuitry and interfaces. The components of a typical computing device are generally enclosed within a housing or enclosure, which may be made of plastic, metal, glass, and/or any other material suitable for protecting the internal components of the computer and for achieving a desired aesthetic appearance.

Interaction between a user and a computer is typically effectuated through I/O devices such as keyboards, trackpads, mice, trackballs, various other pointer devices, monitors, printers, and still other peripheral devices. Frequently, I/O devices are external to the housing and the computing device may be adapted for connecting with peripheral devices using standardized I/O interfaces and/or connectors. I/O connectors for plugging in peripheral devices and their respective circuitry may be provided on the main logic board of the computing device or on auxiliary circuit boards plugged into the main logic board. In some instances, such as certain laptop and handheld computers, certain I/O devices may be at least partially integrated with the computer and accessible through the enclosure. An example of I/O device integration in laptop computers is the incorporation of a keyboard and a touchpad partially within the laptop's housing.

In some instances, desktop computers may also have components integrated within the same enclosure which houses the display device, for example. While such integration generally enhances the user experience, new challenges may be introduced through the implementation of such integration. For example, the compact nature of integrated devices generally results in a smaller design space within which the computer components must be accommodated. The compact design space not only may necessitate smaller sized components but may bring components closer together and likely may necessitate tighter tolerances. The proximity of certain components to others may have undesirable consequences, and last but not least, aesthetic considerations may also dictate design choices. Accordingly, improved devices for locating internal computer components and improved methods for assembling internal components of a computing device within the same enclosure may be needed.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several examples in accordance with the disclosure and are, therefore, not to be considered limiting of its scope, the disclosure will be described with additional specificity and detail through use of the accompanying drawings, in which:

FIG. 5A is a perspective view of an example of a compliant member for mounting a computer component, an example of which is also shown in the figure, according to the present disclosure.

FIG. 8A is a partial perspective view of a circuit board showing a plurality of I/O connectors with a locating device for locating the circuit board relative to the enclosure of the computing device according to one example of the present disclosure.

FIG. 8B is a detail of one portion of the locating device shown in the partial perspective view of FIG. 8A.

FIG. 8C is a detail of another portion of the locating device shown in the partial perspective view of FIG. 8A.

DETAILED DESCRIPTION

Figure 1:
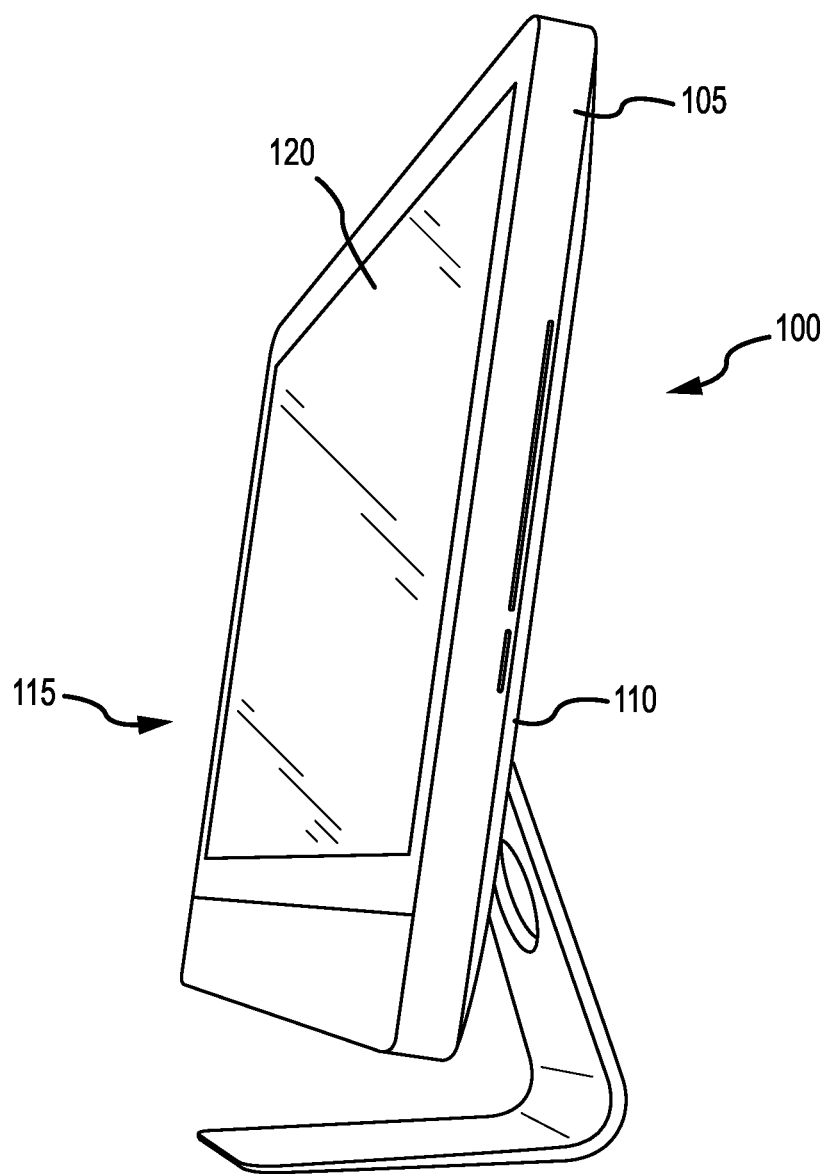
FIG. 1 is a perspective view of an integrated computing device.

In the following detailed description, reference is made to the accompanying drawings, which form a part hereof. In the drawings, similar symbols typically identify similar components, unless context dictates otherwise. The illustrative examples described in the detailed description, drawings, and claims are not meant to be limiting. Other examples may be utilized, and other changes may be made, without departing from the spirit or scope of the subject matter presented herein. It will be readily understood that the aspects of the present disclosure, as generally described herein and illustrated in the Figures, can be arranged, substituted, combined, separated, and designed in a wide variety of different configurations, all of which are implicitly contemplated herein.

The present disclosure relates generally to internal computer assembly features and methods. As briefly discussed above, certain desktop computers may be integrated to include the internal computer components and display device within the same enclosure (see FIG. 1). While advantageous and desirable for a variety of reasons, such integration may pose numerous design challenges. The present disclosure may offer solutions to some of these challenges as will be described and appreciated by those skilled in the art.

FIG. 1 shows a perspective view of a computing device 100 in which certain computer components are provided within or through the same enclosure 105 which houses the display 115. The computing device 100 depicted in FIG. 1 may include various computer components (not shown), such as memory, one or more processors, storage devices, I/O interface devices and other circuitry as may be known in the art. Some of the computer components, for example the hard disk drive, may be mounted directly to the enclosure 105 or a support structure attached to the enclosure 105. Other internal components, for example the processor, system memory, I/O circuitry and connectors, may be provided on a main logic board (a partial view of an example of such logic board is shown in FIG. 8), which may then be mounted to the enclosure 105 in a desired location as will be further described. The computer component, which may be a disk drive or a solid state drive, may be sized and shaped according to any of a variety of standardized form factors (as shown in the examples in FIG. 5A). Using a standardized component may be advantageous in terms of integration and operability, but the present disclosure is not limited in that sense. Computer components having substantially any form factor, can be accommodated using various embodiments of the present disclosure.

Figure 2:
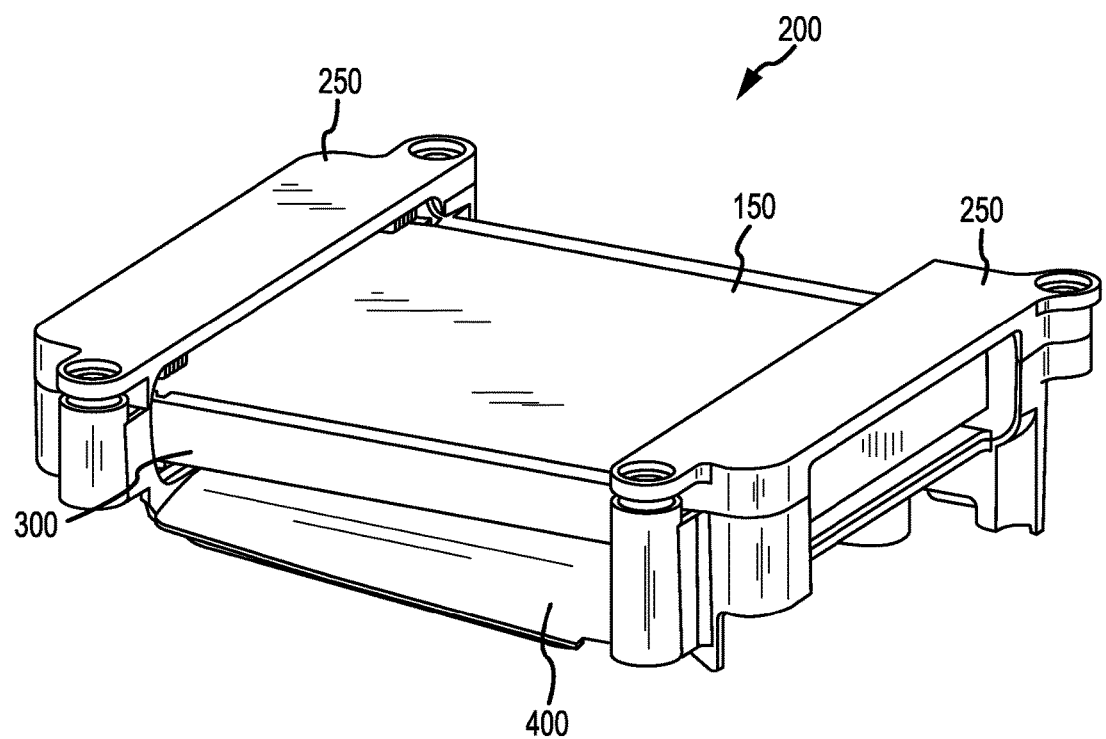
FIG. 2 is an isometric view of a computer component mounting assembly and hard drive according to the present disclosure.

FIG. 2 shows a mounting assembly 200 for mounting one computer component 150, for example a hard drive, to another computer component (not shown in FIG. 2), for example an enclosure of the computing device. Components, other than hard drives may be mounted according to the present disclosure. While specific examples of mounting hard drives to an enclosure are described and depicted herein, the present disclosure is not limited in this manner For example, a display may be mounted to a housing for the display using a frame lined with a gasket configured to reduce vibrations. Other components, such as optical drives, or various vibration generating components such as microphone and/or fans, may be mounted to the enclosure or other support structure according to the examples herein. In another example, a cushioning or a vibration-reducing layer may be provided between a base and other components of a computer attached to the stand, so as to minimize the transfer of vibrations to the components attached to the base. Such an arrangement may be useful if the computing device is placed on a vibrating surface, for example if placed in an automobile or attached to a dashboard of the automobile. External vibrations which may otherwise be transmitted through the base and to other components of the computing device may effectively be minimized according to the present examples.

Referring again to FIG. 2, the mounting assembly 200 may be configured to accommodate a computer component 150, which may be a hard drive as in the present example. The mounting assembly 200 may include a compliant member 300 configured to enclose at least a portion of the computer component 150 (e.g. hard drive), and the assembly 200 may further include a cradle or bracket 400 for mounting the computer component 150 (e.g. hard drive) and compliant member 300 to the enclosure 105 (described previously with reference to FIG. 1). As will be further described, the bracket 400 may be used to orient the component 150 in any desired position within the enclosure, and to mount the component 150, directly or indirectly, to the enclosure 105. For example, the component 150 may be positioned behind and generally parallel to the display 120 within the enclosure 105. As will be further described below, certain features of the bracket, for example variable length fastener posts and/or a base with a varying profile, may be used to accommodate mounting the bracket in such position.

Figure 6:
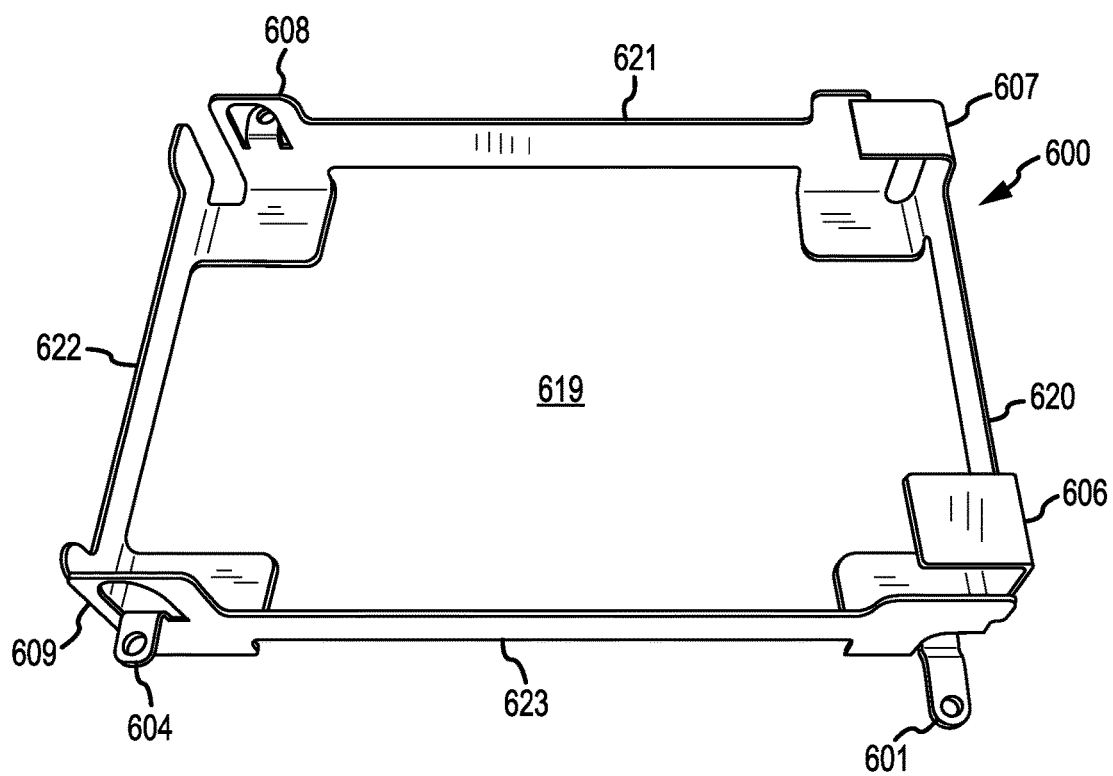
FIG. 6 is a perspective view of a mounting bracket for use with the compliant member in FIG. 5B.

The bracket 400 may include one or more lids 250, as in the present example. In other examples, the computer component 150 enclosed within the compliant member 300 may be retained within the bracket 400 by a snap fit. That is, the bracket 400 may include a top portion which may be configured to extend slightly over the compliant member 300 and component 150 when the two are seated in the bracket 400. The bracket may be adapted such that a top portion of the bracket 400 temporarily deforms to allow the compliant member 300 and component 150 to be inserted in the bracket, subsequently engaging with a surface of the compliant member 300 or component 150. In yet other examples, a combination of these features may be used. That is, the bracket 400 may include a top portion which extends over the compliant member 300 and component 150 (an example of this configuration is depicted in FIG. 6). This top portion may, but need not, deform. Once the component 150 and compliant member 300 are placed in the bracket 400, a lid may additionally be used to secure the component 150 and compliant member 300 within the bracket 400. Other variations and combinations for maintaining the component 150 and compliant member 300 may also be used without departing from the scope of this disclosure.

In some embodiments, the compliant member 300 and bracket 400 may be generally rectangular in shape, however other form factors may be implemented if desired. The compliant member 300 and bracket 400 may be shaped and sized to fit substantially any desired form factor so as to accommodate any of a variety of standardized or uniquely shaped computer components. For example, various vibration or shock sensitive components, such as optical drives, may also be mounted according to the examples herein. In other examples, components tending to generate vibrations, such as microphones, speakers, or fans, may be mounted as described herein so as to prevent vibrations generated by such components from being transmitted to the enclosure and/or other components attached thereto.

Compliant members according to the present disclosure may be configured to reduce or damp out vibrations or other dynamic loading from being transmitted from an external source to the computer component mounted within the bracket, or from the component mounted within the bracket to other components of the computer. For example, in the case of a hard drive, shock or vibrations transmitted to the hard drive while in operation may lead to read/write errors or defective sectors, and some hard drives may be particularly sensitive to vibrations. Shock or vibrations may be generated by a variety of sources external to the hard drive, such as the microphone or fan, or from sources external to the computer (e.g. the user). Conversely, the component 150 (e.g. a microphone or a fan) may generate vibrations which may be transmitted to other components of the computing device 100. To minimize or eliminate undesired motion experienced by the component 150 (e.g. hard drive, optical drive, or the like), a compliant member 300, as will be described, may be placed between the rigid enclosure 105 and the component 150. The component 150 thus insulated may then be provided in a bracket or cradle 400, which may be rigidly mounted to the enclosure 105. The cradle may maintain the component 150 in the desired position relative to the remaining internal components while the compliant member may function to reduce transmission of vibrations to or from the component 150.

Figure 3A:
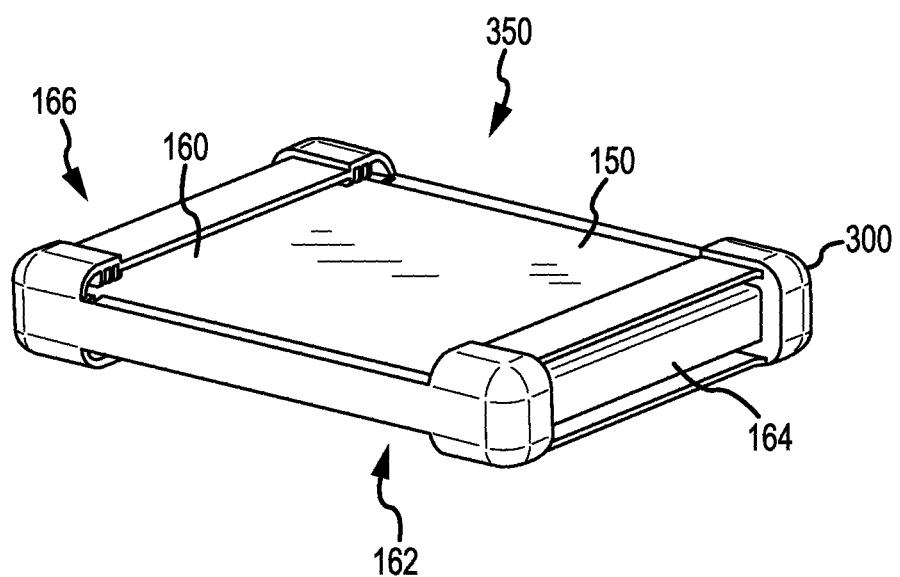
FIG. 3A is an isometric view of a compliant member for mounting a computer component according to one embodiment of the present disclosure and an example computer component therein.

FIG. 3A shows an example of a compliant member 300 according to the present disclosure. The compliant member may be implemented as a sleeve, which may be configured to enclose the component 150 or portions thereof. The compliant member 300, which may be a sleeve, may have a shape which resembles the shape of the component 150 and may be sized to fit snugly over the component 150. In some embodiments, the compliant member 300 may fully enclose the component 150, and openings may be formed in the compliant member 300 for cable runs, for example. In some examples, the interior contact surface of the compliant member 300 may be textured or ribbed to provide a less rigid contact area between the sleeve and component 150. In other embodiments, only portions of the component 150, for example the corners or certain edges, may be enclosed within the compliant member 300.

In some examples, the component may have a generally circular or oval shape, and the compliant member 300 may be shaped generally cylindrical in shape so as to complement the rounded shape of the component. In such examples, the compliant member 300 may be configured to engage with one or more sides and/or edges of the rounded component, for example by receiving the outer perimeter portion of the component 150 within similarly shaped side portion of the sleeve. Other configurations and/or form factors may be used if desired or dictated by the particular application.

The compliant member 300 may be formed using substantially any compliant polymer material, such as rubber or other elastomeric materials. In some examples, 30A durometer rubber or silicon may be used. Other polymers or combinations of polymers may be used and tailored to achieve the desired rigidity or flexibility of the various parts of the compliant member 300 (e.g. sleeve) as described. Foam material and/or gels may also be used in some examples. The compliant member 300 may be sized and shaped such that at least some portions of the sleeve 300 form a snug fit with the component 150. For example, the compliant member 300 or portions thereof may need be stretched to receive the component 150. In some examples the compliant sleeve may define a cavity having substantially the same shape as the component 150 such that the component 150 may be received within the cavity. Certain portions of the compliant member 300 may be configured to elongate or deform more than other portions of the sleeve as will be further described.

Figure 3B:
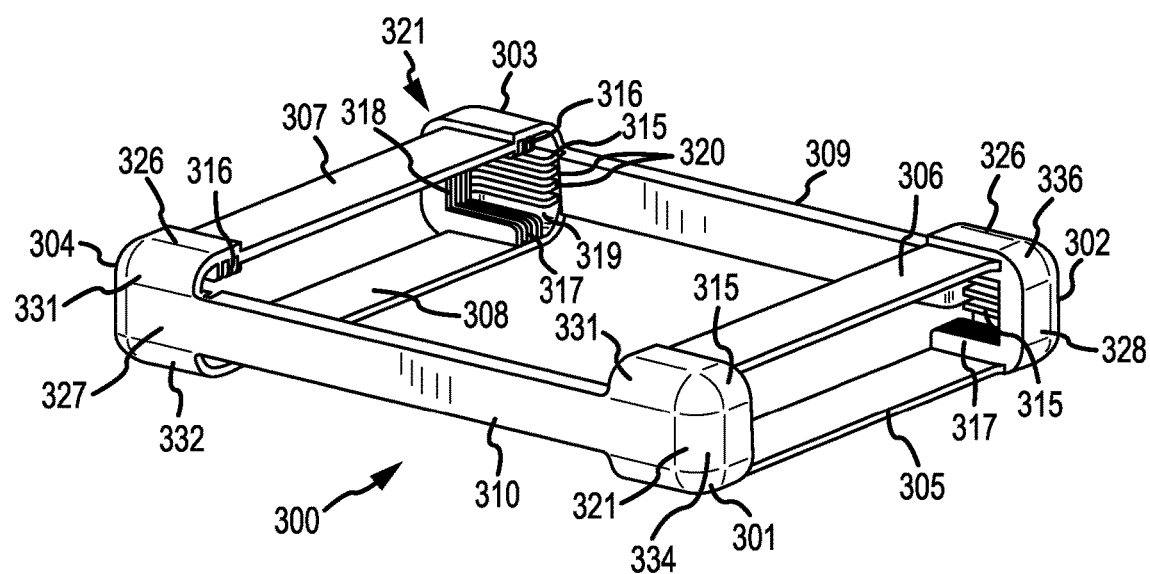
FIG. 3B is an isometric view of the compliant member of FIG. 3A.

The compliant member 300 (e.g. sleeve) may have a plurality of contact portions spaced apart from one another and configured to engage one or more surfaces of the computer component 150. The contact portions may be implemented as corner portions, as will be described further below, or they may be implemented as edge rails, flexible wall spacers, or other similar structures configured to maintain the component 150 in a spaced apart configuration relative to the bracket 400. Referring to the example in FIG. 3B, the compliant member 300 may have four contact portions, which in the present example are the corner portions 301-304. The corner portions 301-304 may be generally rectangular structures, shaped to grip each corner by engaging with one or more surfaces at each corner of the component 150. In the present example, the corner portions are configured such that all four surfaces at each corner contact a corresponding interior surface of the corner portion. In other examples, fewer surfaces may be contacted, for example by providing sufficient tension between two opposing contact surfaces of the corner portions such that the component 150 is maintained in position by friction.

In some embodiments, the number of corner portions may vary, for example when the component 150 has a complex geometry. In other examples, a compliant member 300 which may be configured to enclose a generally rectangular component 150, may have fewer than four corner portions. For example, the sleeve may have two corner portions and may be configured to grip two opposing corners of the component 150 with a void remaining between the component 150 and bracket 400 at the remaining corners not otherwise enclosed in the sleeve. Other combinations for engaging with the component 150 may also be used without departing from the scope of this disclosure.

In some examples, the contact portions (e.g. corner portions 301-304) may reduce vibrations that may otherwise be transmitted to the component 150 during various dynamic loading conditions (e.g when component 150 is subjected to sudden movements). Each of the corner portions 301-304 may include a plurality of structures adapted to act as a spring and thereby essentially "float" or "suspend" the component 150 relative to the rest of the structure (e.g. enclosure 105). The spring structures may be implemented as a plurality of protrusions or fingers 315-318, which project perpendicularly from one or more surfaces 319 of the contact portions. In the present example, the corner portions 301-304 are configured to enclose and contact all four surface of the component 150 at each respective corner. Accordingly, spring structures (e.g. fingers 315-318) are provided perpendicular to each of the surfaces of the contact portions opposite respective surfaces of the component 150. That is, each interior surface of each corner portion may have one or more fingers extending therefrom. In some examples, three or more fingers may protrude from each surface. In other examples fewer than three fingers may be used and tailored to provide a desired stiffness of the joint at each corner. The plurality of fingers 315-318 may be parallel to one another, or they may be angled relative to one another. In some examples, the fingers 315-318 may be regularly or irregularly spaced apart. Some or all of the fingers may have cross-sectional profiles different from the cross-sectional profiles of other ones of the fingers 315-318. For example, some of the fingers may have a generally rectangular transverse cross-section, while other fingers may be shaped as a trapezoid.

The fingers 315-318 may also vary in thickness and composition (e.g. different fingers being made from different materials). As described, different materials, including various elastomeric materials, foams or gels may be used to form the contact portions of the compliant member 300. Combinations of or composite materials may be use to tailor the stiffness of the contact portions. For example, foam and/or gel may be added between the fingers 315-318 or used in place of the fingers 315-318. As will be appreciated, many other form factors may be used. For example, additional ribs may be provided between some or all of the individual fingers 320 to stiffen the joint, if desired. In examples, the cross sectional profile of the fingers may change, for example widen, as a particular finger 320 approaches and attaches to the surface 319. By varying the length, thickness, material and other design parameters, the compressive and bending stiffness of each finger the compliant joint 321 as a whole may be tailored as may be appropriate as desired.

As described, the cross-section of the corner portions may be generally rectangular, and in some examples, the corners of the outer surfaces or some or all of the corner portions may be rounded. That is, in some embodiments, the corner portions 301-304 may have rounded and/or flattened portions. Surfaces 326, 327, 328, as examples, may be generally flat and may provide a stable contact area with corresponding surfaces the bracket 400. Some or all of the corners, 331, 332, 334, and 336, as examples, may be rounded for ease of placement of the sleeve 300 within the bracket 400 and/or lid 250. Thus, the combination of flattened surfaces and rounded corners may allow for the sleeve assembly 350 to be easily inserted in the bracket 400 while providing a stable contact surface between the two. The rounded and flattened portions of the sleeve 300 and corresponding matching surfaces of the bracket 400 may also serve a locating function (e.g. to dictate a placement of the sleeve in a particular position within the bracket). Other locating features on the mating surfaces of the sleeve 300 and bracket 400 may also be included without departing from the scope of this disclosure.

In further examples, some or all of the corner portions 301-304 may be connected using connector strips 305-310, which may be fabricated from the same or a different elastomeric material. The connector strips 305-310 may be solid along their length or they may have one or more cutouts for added flexibility or for access the component 150, for example for plugging in a cable. The connector strips 305-310 may or may not come in contact with the component 150. In some examples, the thickness of the strips may vary along their length, or certain surface features such as ribs, may be added if desired. That is, in some examples, the strips (e.g. 305-310) may lay against the surface of the component along all or a portion of the distance which they span. Alternatively, the strips (e.g. 305-310) may be offset from the surface of the component 150. As will be understood, any combinations of number and/or placement of the connector strips may be used. For example, one or more connector strips may be used to connect the corner portions along a top 160 and/or bottom 162 surfaces of the component 150 (see FIG. 3A), or the may span the sides 164, 166 of the component. The sleeve may include some of the strips 305-310 or additional strips may be added.

In some examples, the compliant member 300 (e.g. sleeve) may be formed as a single unitary structure, for example by conventional injection molding or other conventional polymer fabrication techniques. In other examples, portions of the compliant member 300, for example the corner portions, may be fabricated separately from other portions and assemble to form the sleeve 300. Different polymeric materials may be used for different portions of the compliant member as desired and/or to obtain effective damping of motion which may otherwise be transmitted to the component 150. For example, overmolding may be used to lay-up a compliant member 300 (e.g. sleeve) having a softer interior and a stiffer outer layer, for example. Conventional injection molding techniques may be used and different materials may be injected at different location along the mold to obtain a desired stiffness of the various portions of the compliant member 300.

In some examples, the compliant member 300 may include only the contact portions (e.g. corner portions 301-304), which in this example may not be connected together but may instead separately engage with each edge or corner of the component 150 before placing the component 150 into the bracket 400. Alternatively, the contact portions may be fixedly secured to the bracket 400 and the component 150 may be positioned into the cradle without removing the contact portion. Other variations of providing the compliant member 300 between the component 150 and the bracket or cradle 400 may be used without departing from the scope of this disclosure. For example, a pliable material, such as an encapsulated gel, or a shape-memory material, such as a viscoelastic memory foam, may be layered within the bracket 400 or over other stiffer layers disposed in the bracket. The pliable or shape-memory material may be allowed to deform to the shape of the component 150 when the component 150 is provided therein. In the case of using a gel, alone or in combination with other polymeric materials, the gel may aid with cooling the component 150 by absorbing some of the excess heat generated by the component 150. Cutouts or other features may also be included through the thickness of these materials to allow for cooling of the component 150.

Figure 4:
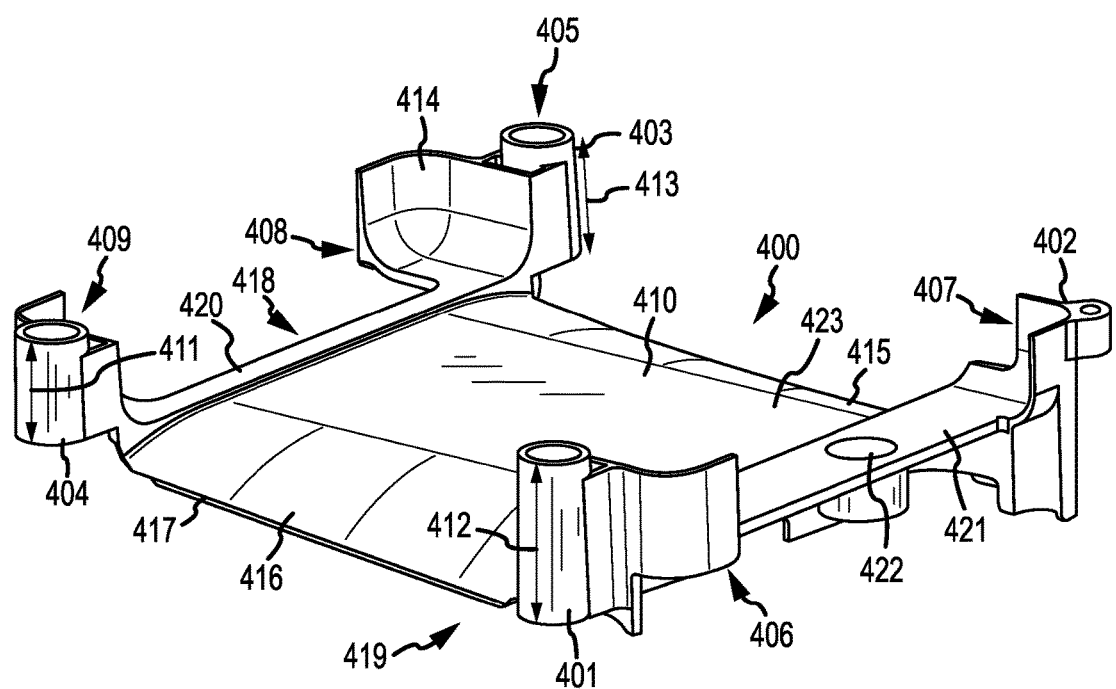
FIG. 4 is an isometric view of a mounting bracket according to one embodiment of the present disclosure.

Referring now to FIG. 4, a mounting bracket 400 according to the present disclosure may include support members 401-404, one or more receiving portions 406-409, and a bottom portion and/or side portions 410 connecting the receiving portions 406-409 together. The bracket 400 may be sized and shaped to accommodate the component 150 and compliant member 300 therein. The mounting bracket 400 may be sized and shaped to form a snug fit with the sleeve assembly 350. In this manner free play between the bracket and sleeve assembly 350 may be reduced and/or undesirable movement of the component 150 may be minimized. In some examples, additional structures (e.g. top brackets or lids 250) may be included to further secure the sleeve assembly 350 within the mounting bracket 400.

The bracket 400 may be rigidly mounted, directly or indirectly, to the computer enclosure (e.g., by mounting it to other internal structure of the enclosure 105, such as ribs, posts, or other similar structures). The bracket 400 may be affixed to the enclosure using any conventional means, for example by fastening, welding, bonding, adhering or the like. The bracket 400 may be bolted to the enclosure 105 using the support members 401-404, which may be implemented as posts and which may have a threaded portion 405 for securing the bracket using a standard fastener. The support members 401-404 may be generally identical in shape and/or size.

In some examples, the bracket 400 may need to be mounted to a surface which is not flat, for example the interior back surface of the enclosure 105 (shown in FIG. 1), which may be curved or angled relative to the bracket 400. When mounted, the base 410 of the bracket 400, and specifically the under surface 419 of the base is adjacent the interior surface of the enclosure 105. In order to accommodate the curved profile 110 of the enclosure 105, the bracket 400 may be shaped to complement such a curved profile 110, and the support members 401-404 may be configured to be mounted to a curved surface or a surface disposed at an angle relative to the longitudinal axis of the bracket 400. To achieve this, the length of one or more of the support members 401-404 (e.g. posts) may be different from the length of other support members. That is one or more of the posts 401-404 may be longer or extend further in a given direction than other posts. One or more of the lengths 411-413 may be different than the lengths of the other posts. In other examples, bosses on the interior surface of the enclosure having different lengths may be used in order to compensate for the variable distance between the bracket 400 and the mounting surface.

The mounting bracket 400 may further include one or more receiving portions 406-409 for accommodating the sleeve assembly 350 which includes the compliant member (e.g. sleeve) 300 and component 150 therewithin. The receiving portions 406-409 may be shaped substantially identically to the exterior portions of the compliant member 300 which will be provided within the receiving portions 406-409 thereby working in conjunction to stabilize the sleeve assembly 350 within the bracket. For example, the receiving portion 408 may have an inner surface 414 (e.g. inner mold line) which may be substantially the same as the outer surface 321 (e.g. outer mold line) of the corner portions 301-304. The receiving portions 406-409 may be connected using one or more rails 420, 421, which may be substantially flat or otherwise shaped to match the bottom profile of the sleeve. The rails need not be identically shaped or sized, and one or more of the rails may include additional features, for example cutouts 422 for routing cables through the bracket and to the component 150 to be mounted therein. In some examples, the cutout 422 may additionally serve to secure the cable runs in place and/or prevent the cables from interfering with other components. In some examples, one or more of the rails (e.g. rail 420) may extend substantially to the edge of the respective receiving portions (e.g. 408 and 409) so as to provide a more stable base for the sleeve assembly 350.

As mentioned above, the mounting bracket 400 may also include a base 410 which extends between the rails 420 and 421. The base 410 may include a generally flat portion 423 and curved portions 415 and 416, the curvature of which need not be the same. The base 410 may be configured to form a cooling channel between the lower surface of the component 150 (not shown in FIG. 4) and the upper most portion of the base. For example, the generally flat portion 423, which is be the upper most portion of the base 410, may be spaced apart from a plane defined by the rails 420, 421. The rails 420, 421, working in cooperation with the receiving portions 406-409, as previously described, may be configured to support the sleeve assembly 350 within the bracket 400 thereby controlling the placement of the assembly 350 relative to the base 410. Accordingly, an air space may be formed which may assist with cooling of the component 150. The combination of the surface profiles of the curved portions 415, 416, and base 410 may in cooperation define an airfoil-like surface 417, which may speed up air passing under the component 150 thereby improving the cooling characteristics of the mounting assembly 200 (see FIG. 2). As will be understood, any other airfoil profiles or combinations of curved and/or flat surfaces may be used to tailor the flow of air below the components. In some examples, the rails 420, 421 may instead be placed between support member 401 and 404 and between support member 402 and 403, and the airfoil-like surface 417 may instead span a direction orthogonal to the direction depicted in FIG. 4. In other examples, the bracket 400 may not include rails and two airfoil-like profiles may be defined along the two orthogonal directions between the support members 401-404. As can be appreciated, numerous variations are possible to take advantage of the location of various active cooling components (e.g. fans or other sources of airflow) relative to the mounting assembly 200 (as shown in FIG. 2).

Figure 5B:
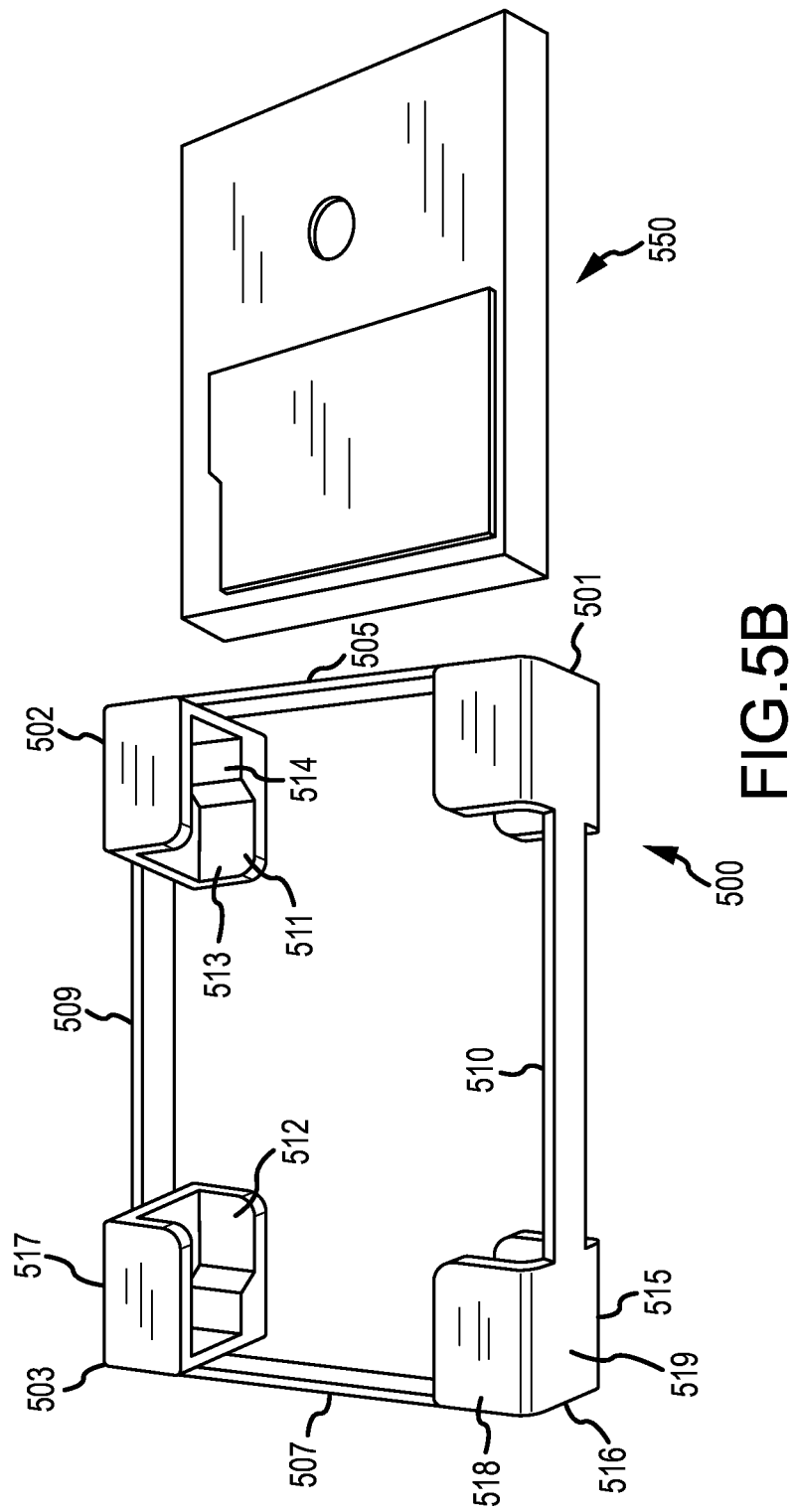
FIG. 5B is a perspective view of another example of a compliant member for mounting a computer component with an example component according to the present disclosure.

FIGS. 5A and 5B show examples of computer components 150 and compliant members 300 for mounting the computer components 150 according to the present disclosure. FIG. 5A, shows the compliant member (e.g. sleeve) 300 discussed previously with reference to FIGS. 2-4, which may include any of the combinations of features described herein. FIG. 5A shows another example of a compliant member 500 for mounting a component 550, which may be of a different size than the component 150. As with the sleeve 300, generally any computer component, such as a hard disk drive, an optical disk drive, sold state drive, audio components, various cooling components, or others, may be mounted to the enclosure or other structures of a computing device. As previously described, the components 150, 550 may vary in shape and/or size and accordingly sleeves 300 and 500 having complementary shapes and sizes may be manufactured for accommodating such components. It will also be understood that any of the compliant sleeves 300 and/or 500 may be implemented to incorporate any of the features of compliant sleeves described and appreciated in light of this disclosure.

The compliant member 500 may include many of the same features as the compliant member 300. For example, the compliant member 500 may include one or more corner portions 501-504, which may include similar features as the corner portions 301-304 previously described (see FIG. 3B). For example, one or more damping features (e.g. spring structures) similar or identical to the fingers 315-318 of sleeve 300 may be included on inner surfaces of the corner portions 501-504. One or more of the corner portions 502, 503 may have surface 511, 512 with variable profiles. This feature may be used, in conjunction with the examples of spring structures (not shown in this figure for clarity of illustration), to adjust the stiffness at different locations within the corner portions 501-504. For example, the lower portion 513 of the surface 511 may accommodate longer length fingers, while the upper portion 514 of the surface 511 may have shorter fingers. The shorter fingers may be stiffer than the longer fingers, and accordingly the stiffness provided by the corner portion 502 may vary along the length of surface 511.

The corner portions 501-504 may have flattened and rounded surfaces, as previously described. In some examples, the corner portions 501-504 may be nearly fully rounded to form a generally circular or oval structure. Air spaces may remain between the sleeve and certain parts of the bracket 400 in such examples, or the receiving portions of the bracket 400 may have a complementary shape to the corner portions, as previously described. In other examples, the corner portions 501-504 may be generally angular 515-517 with the corners transitioning one surface 518 at a nearly right angle to the adjacent surface 519. The corners of a corresponding bracket, as will be described below with reference to FIG. 6, may have a similar angular arrangement rather than having rounded receiving portions as previously described.

The compliant sleeve 500 may also include connecting strips 505, 507, 509, and 510 which may be implemented similarly to the connecting strips 305-310 previously described. Any number of connector strips may be used, for example the four connecting strips 505, 507, 509, and 510, as shown, or other number or placement of strips may selected as previously discussed. The connecting strips 505, 507, 509, and 510 may serve the function of connecting the corner portions and/or tensioning the corner portions against the surfaces of the component 550. The strips may also be used to reduce vibrations, for example by being provided with certain surface features which may contact the surfaces of the component 550 and further cushion the component 550 therewithin.

FIG. 6 shows another example of a bracket or cradle 600 for use with the compliant member 500 of FIG. 5B. The bracket 600 may include many of the features of the bracket 400 previously described and accordingly, and for brevity their description will not be repeated. For example, the bracket 600 may include receiving portions 606-609 for seating the corner portions 501-504 of the sleeve 500, and the bracket 600 may further have mounting portion 601, 604, as examples, which may be used to fasten the bracket to the enclosure (not shown) using any conventional means. Analogous to the bracket 400, the mounting portions may be configured to accommodate a slanted mounting surface. In some examples, the mounting portions 601, 604, may be located at different distances from the bottom plane 619 of the bracket, thus allowing the bracket 600 to be provided at an angle to the slanted surface. That is the mounting portion 601 may be used to mount one end of the bracket 600 in a more elevated position as compared to the end mounted using the mounting portion 604. In other examples, in place of or in combination with the above feature, bosses of different heights may be used to further tailor the relative angle between the mounting surface and the plane 619 of the bracket 600.

In certain examples, the bracket 600 may be mounted with the top portions of the receiving portions 607, 606 closest to the mounting surface. In such examples, the component 550 (e.g. the hard drive shown in FIG. 5B) is first inserted in the bracket 600, for example by sliding the component 550 and sleeve 500 in the receiving portions 607, 608 such that the top portions of the receiving portions 607, 606 engage the component and sleeve. The bracket 600 is attached to the mounting surface in an upside-down position relative to the mounting surface such that the compliant member 500 and component 550 are sandwiched between the mounting surface (not shown) and portions of the bracket 600. One or more surfaces of the compliant member 500 may be in contact with the mounting surface in this configuration. In this manner, the compliant member 500 and component 550 enclosed therewithin may be held in place by a combination of the bracket 600 and the mounting surface, for example the interior surface of the enclosure, to which the bracket 600 may be attached. In this manner, the bracket 600 may be used without a top bracket (e.g. lid 250 of the example in FIG. 2). The mounting surface (e.g. interior surface of the enclosure) may function as the top bracket or lid, when the bracket 600 is mounted in this configuration.

In the example in FIG. 6, the bracket 600 may not have a bottom plane 619 but may instead include a plurality of side members 620-623 which connect the receiving portions 606-609 of the bracket 600. The brackets 400 and/or 600 may be formed using substantially any rigid material, such as plastic, metallic materials and others. The brackets 400 and 600 may be formed as single-piece (e.g. monolithic) structures or their respective components may be fabricated and assembled to form the brackets described. As will be appreciated, many variations of the brackets 400 and 600 described herein are possible without departing from the scope of this disclosure, and the examples provided are for illustration only and not to be viewed in a limiting sense.

Figure 9A:
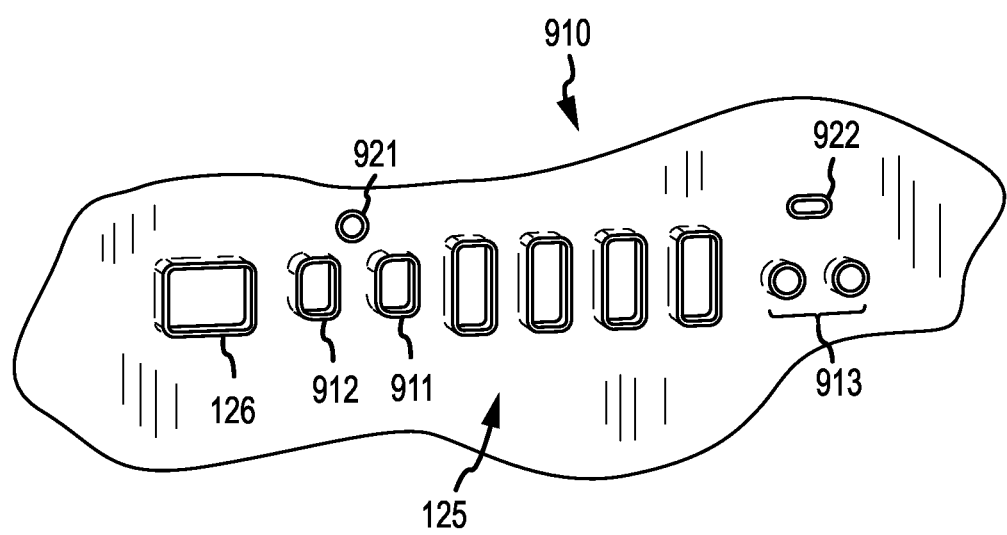
FIG. 9A is a partial view of the back of the enclosure depicted in FIGS. 7A-B looking outwardly from the interior and showing the plurality of I/O openings depicted in FIGS. 7A-B.
Figure 9B:
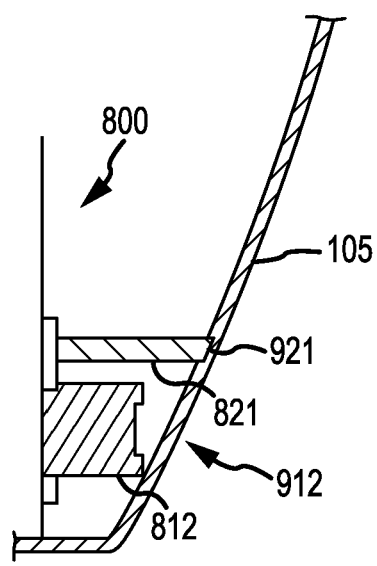
FIG. 9B is a partial cross-section taken at line 9B-9B of FIG. 7B.

Referring now to FIG. 7-9, examples of devices and methods for mechanically locating and aligning internal computer components will be described. As will be understood, degrees of freedom (DOF) of a rigid body are determined base on the number of axes along or about which the body may be allowed to move. Generally, in a Cartesian coordinate system, an unconstrained body may be able to translate along the three axes, X, Y, and Z and may also be able to rotate about all three axes. A body is said to be fully constrained (e.g. all six DOF have been removed) when the body is fixed in all six DOF (e.g. movement along and about all axes is prevented). In the context of the present disclosure, in addition to positioning the component in a desired location, the term "locating" may also be used to mean constraining the component in some or all of the DOF.

In the case of conventional computers the enclosure may be generally rectangular with each of the flat surfaces of the enclosure arranged at right angles to each other. Locating and/or aligning components relative to such rectangular enclosure may be fairly easy as the flat surfaces may themselves be used to drive alignment. For example, a logic board may have a generally flat surface and may have two or more edges that are orthogonal to each other. Certain components on the logic board, for example I/O ports, may protrude from the board, typically at right angles to the board. As such, top surfaces of the I/O ports may define a plane which is parallel to the logic board. The top surface of the I/O port, in cooperation with one or more of the edges of the board, may be used to locate and align the board relative to certain features in the enclosure (e.g. cutouts through the enclosure, which may be used to access the ports). Furthermore, as the top surface of the I/O ports and the inner surface of the enclosure are typically parallel to each other, it may be easier to maintain the two parts in alignment during use because the surfaces may typically be resting against one another.

Figure 7A:
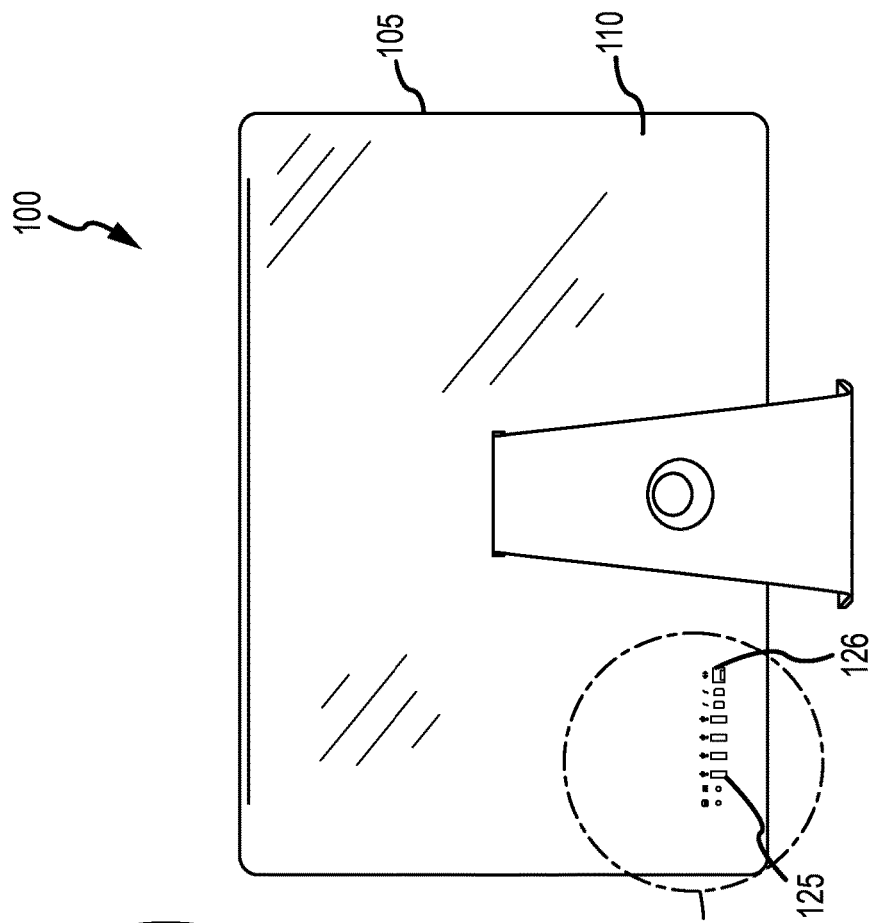
FIG. 7A is a back view of the integrated computing device of FIG. 1.
Figure 7B:
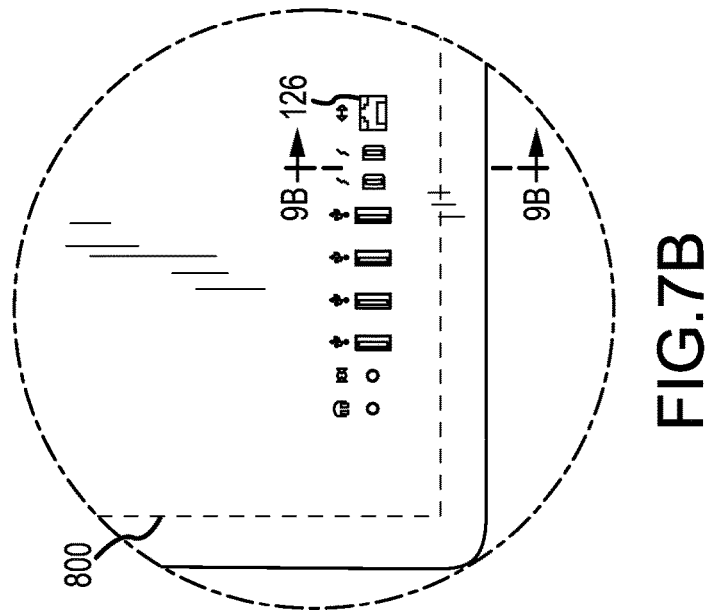
FIG. 7B is a detail of FIG. 7A.

In some instances, it may be desirable to locate and thereby maintain a generally rectangular component in alignment relative to an angled surface. For example, in the case of the computing device in FIG. 1, some of the surfaces of the enclosure 105 may be curved. The back of the enclosure 105 is shown in FIG. 7A, and in further detail in FIG. 7B. The enclosure 105 of the device 100 may have one or more cutouts 125, 126 for accessing one or more of the I/O ports, which may include a variety of standard I/O ports (USB, HDMI, Ethernet, audio ports, or the like). Each cutout 126 may be shaped and sized to accommodate access to the port and allow the user insert a corresponding standard plug therethrough. The number and relative arrangement of the ports and cutouts may be varied and the particular example depicted and described herein is for illustration purposes only. The circuit board (shown in phantom lines in FIG. 7B), to which the I/O ports are connected, may need to be aligned relative to the enclosure such that each of the I/O ports is accessible through the corresponding cutout. Misalignment of one or more of the I/O ports may at the very least be displeasing to the user from a cosmetic standpoint. From a functional standpoint, misalignment may render the I/O port useless (e.g. inaccessible) or may cause damage to the port and/or plug due to interferences when the user attempts to plug into the port. As can be appreciated, good alignment may be desirable for both functional and aesthetic reasons. When mounting components with complex surfaces, optical equipment, such as charge-coupled device (CCD) cameras or laser alignment tools, may frequently be required to locate and align the components. However, the use of such equipment is expensive and time consuming. The exemplary devices and methods for locating internal components described herein may address these and other problems in the art.

FIG. 8 shows a partial view of an example logic board 800 with a plurality of I/O ports 810 attached thereto. As described, the ports 810 are typically attached to the board so that they project generally orthogonally from the board. The ports 810 may be provided adjacent a bottom edge of the logic board 800 and may be generally aligned for cosmetic reasons, for example along a centerline of each port 810. References to locations (e.g. "top," "bottom," etc.) are used herein for purposes of facilitating a description of the examples, and are not to be taken in a limiting sense. The logic board 800 may be attached to the enclosure 105 (see FIG. 1) during assembly such that the plurality of I/O ports 810 are visible and/or accessible through the cutouts 125, 126. Accordingly, mechanical locating devices, which may allow for precise alignment of the logic board 800 relative to the enclosure without the use of optical equipment, is described in further detail below.

The mechanical locating devices according to the present disclosure may include a plurality of locator pins which are configured to engage within respective locator divots formed on a surface of the enclosure. Each pin may be sized to fit within the respective divot and the combination of pins and divots described may effectively restraint movement of the logic board 800. In some embodiments, and as depicted in FIG. 8, two locator pins 821, 822 may be used to drive alignment. The pins 821, 822 may be sufficiently spaced apart so as to achieve the desired angular control. Various form factors and number of pins may be used to suit the particular application. That is, a variety of combinations of shapes and number of pins may be used, some of which will be further described below and other appreciated in light of this disclosure.

In the example in FIG. 8, a first pin 821, which may be have a circular cross-section, may be provided proximate a first I/O port 811. A second pin 822, which may have a generally rectangular cross-section, may be provided proximate a second I/O port 813. The first or circular pin 821 may be used to establish a first datum point during assembly, which may generally restrain all but one axis of freedom. In this example, the first pin restrains translation along all axes and rotation about all but one of the axes. The logic board 800, once located using the first pin, may still be free to rotate about the third axis (e.g. the center axis of the pin 821). The second pin 822 may then be used to restrain the last (e.g. rotational) degree of freedom. That is, rotation about the axis of pin 821 is restrained upon engaging the second locator pin within the second slot (e.g. "locking" the board 800 in place). A different sequence may be instead be used. That is, the rectangular pin 822 may be placed in engagement with its corresponding divot. Depending on tolerances and other design considerations, the pin 822 may still be able to translate along one axis (e.g. the longitudinal axis of the pin's cross-section). Engaging pin 821 with its respective circular divot may then constrain the last degree of freedom.

In some examples, the locator pins 821, 822 may be located a certain distance apart to minimize or remove relative movement of the parts without over constraining the alignment. If the pins are very close together, for example adjacent one another, motion may be fully constrained as between the two pins but perimeter portions of the component (e.g. logic board 800) may be free to move relative to certain other portions of the enclosure. Alignment and/or locating of features or devices on the logic board 800, which are farther away from the pins, may be poor when the pins are so close to one another. On the other hand, if the pins are placed at the farthest ends of the board, engagement with the divots may be difficult due to imperfections and imprecision of the manufacturing process. Therefore, the locator features may be spaced apart by some intermediate distance between the two extreme examples described. The spacing between the pins may, in some instances, be from about 3 inches to about 10 inches apart. In other examples, the pins may be from about 4 inches to about 6 inches apart. In some examples, the pins may be about 5 inches apart. Other distances may be used as desired or depending on certain design considerations.

The placement of the locator features on the board may be selected based on which components it may be most critical to locate precisely. That is, while the locator features described in reference to the logic board 800 may have been placed anywhere on the board, for example along top portions of the board (not shown in the figure), in the particular case it may be desirable to place the locator pins near the ports because the ports may require more precise alignment than other portions of the board. However, the depicted location is provided as an example to illustrate the inventive concepts herein, and the locations of the pins in other examples may vary.

Furthermore, in some embodiments, and as shown in the example in FIG. 8, a circular pin 821 and a rectangular pin 822 may be used in combination to achieve precise alignment without over constraining the system when manufacturing tolerances are taken into account. Other shapes and combinations may be used, for example two circular pins, which may have relaxed tolerances to prevent over constraining the assembly. Two rectangular pins, disposed at an angle to one another (e.g. orthogonally to each other) may be used in other examples. According to yet other examples, pins having different tolerances may be used. For example, one pin may be designed to have a clearance fit and/or with a large manufacturing tolerance. The clearance fit and/or larger tolerance may allow for certain amount of movement between the two parts when only the first pin is engaged. A second pin may be used, which has a tighter tolerance or which is design for a transition/location fit with its mating divot. When mated within the corresponding divot, the second fit may prevent any movement, locking the two parts into place.

FIG. 9A shows a portion of the interior surface of the enclosure 910, through which the plurality of cutouts 125, 126 may be provided for accessing a plurality of I/O connectors previously described. The enclosure 910 may be identical or similar to the enclosure 110 of FIG. 7. For example, and as previously described, the enclosure 910 may have first 911 and second 912 cutouts adjacent one another. The cutouts 911, 912 may configured to allow the user to plug into a corresponding I/O port and may accordingly be sized and shaped to allow for a plug of the kind to be inserted therethrough. In some examples, a first locator feature 921 may be provided adjacent the first 911 and/or second 912 cutouts. A second locator feature 922 may be spaced apart from the first locator feature 921 and provided adjacent another one or plurality of cutouts 913. The locator features 921 and 922 are surface features (e.g. detents, or protrusions) and are not apertures extending through the thickness of the enclosure. As such, the locator features are not visible through or on any of the cosmetic (e.g. exterior) surfaces of the computing device. In some examples, the first 921 and second 922 locator features may be aligned along one or more axes relative to each other, however such alignment is not necessary for proper functioning of the locating devices. Generally, any spacing and or relative positioning of the locator features 921 and 922 may be used provided the features 921 and 922 are positioned to correspond to the placement of the pins on the logic board 800 or other component. In the present example, two locating pins (e.g. 821, 822) are used to drive alignment in cooperation with the two locator features 921, 922 depicted in FIG. 9A.

In some example, the locator features (e.g. features 921, 922) may be shaped to complement the cross section of each pin. That is, in the present example, a circular divot (e.g. feature 921) and an elongated slot or divot (e.g. feature 922) may be used. As will be appreciated, the combination of circular and elongated locating features may be advantageous as they may allow for good alignment to be obtained without over constraining the alignment. For example, if two circular pins and divots are used it may be difficult to engage with their corresponding locator features as manufacturing tolerances may cause the two pins to be spaced apart slightly differently than their corresponding locator features. By using a circular pin, the logic board 800 may be located and constrained in all but one axis (e.g. rotation about the centerline of pin 821). Subsequently, the logic board 800 may be rotated until it snaps within slot 922, with the longitudinal configuration of the slot 922 compensating for slight differences in manufacturing tolerances. However, and as previously described, other implementations may also be used which may allow for sufficient movement of the parts (e.g. logic board 800 and enclosure 910) relative to one another such that the pins may engage with the divots.

In some examples, the locating features (e.g. pins 821, 822 and corresponding surface features 921, 922) may be e configured to accommodate a curved enclosure. As depicted in FIG. 9, the enclosure 105 may have a curved profile. Accordingly, so that the connector 812 is precisely located relative to the enclosure and the cutout 912, the pin 821 may have a first length selected to provide pin 821 in engagement with the feature 921. A second pin (e.g. pin 822) may have a second length also selected to provide pin 822 in engagement with the feature 922. That is, in examples, the length of the respective pins 821, 822 may be selected to correspond to the depth of the enclosure in a particular location, thus accommodating for the curved surface 110 of the enclosure 105. As will be appreciated, while particular examples of subtractive features (e.g. divots/slots 921, 922) have been depicted and described, the surface features may be additive (e.g., protruding features provided on the inner surface of the enclosure 105).

Any combination and number of pins may be used to achieve a desired level of control and precision of the alignment. For example, three locating pins may be used in some cases. Two of the pins may be elongated pins configured to be provided within elongated divots. A third pin, which may be circular in cross-section, may be used to restrain remaining freedoms of motion. For example, the elongated pins may be parallel to each other. Once the elongated pins are provided in engagement with the divots, the part may be substantially restrained from movement in all but one translational axis. A circular pin may be used to lock the part into place preventing any further translation or sliding of the part relative to the surface to which it is being located. Additional features such as dents or protrusions may be used to snap the pins into place. In some examples, the pins and/or divots may be made from or lined using a polymer material which may be allowed to compress slightly to allow for an interfering fit between the pin and divot.

While the specific examples described relate to aligning I/O ports to their corresponding openings, the locating devices according to this disclosure may be used to align a wide variety of other components. For example, in addition to locating circuit boards relative to another structure of the computing device, locating devices of this type may be used with for aligning the mounting brackets 400, 500 as may be desired. Locating devices may also be incorporated in display modules, internal power source devices, storage devices, and others. According to the examples described, and as will be appreciated, precise placement of various internal components may be achieved without the use of an optical device.

Examples of devices for mechanically aligning an internal computer component relative to an enclosure have been described. An exemplary device for mechanical alignment may include a first pin rigidly mounted to the internal computer component at a first location and configured to engage with a first locating feature provided on a surface of the enclosure, the first locating feature shaped so as to mechanically engage the first pin. The device may further include a second pin rigidly mounted to the internal computer component at a second location spaced apart from the first location, the second pin configured to engage with a second locating feature provided on a surface of the enclosure. In some examples, the first pin may have a circular cross-sectional profile, and the second pin may have a an elongated cross-sectional profile. In examples, the first locating feature may have a shape substantially similar to the cross-sectional profile of the first pin, and the second locating feature may have a shape substantially similar to the cross-sectional profile of the second pin. In examples, one or more of the first pin and second pin may be attached proximate one or more I/O connectors. In preferred examples, the circular pin may be mounted adjacent critical I/O connectors from the standpoint of requiring precise alignment. In some examples, the first pin may have a first height and the second pin may have a second height, the second height being different from the first height.

An exemplary method of aligning an internal computer component relative to an enclosure may include the steps of engaging a first pin attached to the computer component with a first feature provided on a surface of the enclosure, and moving the computer component to engage a second pin attached to the computer component with a second feature provided on the surface of the enclosure. According to some examples, the step of engaging the first pin may include inserting the first pin within a divot on the surface of the enclosure. According to some examples, the step of engaging the first pin may include providing a circular pin within a circular surface feature on the surface of the enclosure, and the step of moving the computer component may include rotating the computer component about the center axis of the first pin. In light of the examples described, various other implementation of devices for locating and alignment of components without the use of optical equipment may be appreciated and practiced without departing from the scope of the present disclosure.

While various aspects and examples have been disclosed herein, other aspects and examples will be apparent to those skilled in the art. The various aspects and examples disclosed herein are for purposes of illustration and are not intended to be limiting, with the true scope and spirit being indicated by the following claims.

What is claimed is:

1. An assembly for mounting a computer component, comprising:
    an elastomeric sleeve having a plurality of corner portions configured to receive corresponding corner portions of the computer component, at least one of the corner portions of the elastomeric sleeve comprising a plurality of retaining elements protruding from a surface of the elastomeric sleeve and configured to contact the corresponding corner portion of the computer component received by the at least one of the corner portions of the elastomeric sleeve, wherein the retaining elements are located between the at least one of the corner portions of the elastomeric sleeve and the computer component; and
    a bracket that surrounds the elastomeric sleeve, wherein the bracket is configured to mount the elastomeric sleeve and computer component to a computer housing.

2. The assembly of claim 1, wherein the elastomeric sleeve comprises a plurality of polymeric materials.

3. The assembly of claim 1, wherein the retaining elements protrude substantially perpendicularly from the surface of the elastomeric sleeve.

4. The assembly of claim 1, wherein at least one of the plurality of retaining elements has a shape which is different than a shape of another one of the plurality of retaining elements.

5. The assembly of claim 1 wherein each of the corner portions of the elastomeric sleeve includes rounded exterior surfaces, and wherein receiving surfaces of the bracket are shaped to match the rounded exterior surfaces of the corner portions of the elastomeric sleeve.

6. The assembly of claim 1, wherein the corner portions of the elastomeric sleeve are wider than other portions of the elastomeric sleeve.

7. The assembly of claim 1, wherein the bracket has a deformable portion that overlaps the elastomeric sleeve and bends to receive the elastomeric sleeve in the bracket.

8. The assembly of claim 1 wherein the bracket is configured to be mounted at an angle to a surface of the computer housing.

9. The assembly of claim 1 wherein the bracket includes a plurality of mounting portions, at least one of the plurality of mounting portions having a height different than a height of another one of the plurality of mounting portions.

10. The assembly of claim 1, wherein the bracket includes a surface connecting a plurality of corners of the bracket, and wherein the surface is offset from a plane defined by the corners of the bracket.

11. The assembly of claim 10, wherein at least a portion of the surface is curved.

12. A computing device comprising:
an enclosure defining an exterior surface and a curved interior surface of the computing device; and
a mounting assembly disposed within the enclosure and mounted to the curved interior surface of the enclosure, the mounting assembly comprising:
a mounting bracket comprising first, second, third, and fourth support members fastened to the curved interior surface of the enclosure, wherein the first and third support members have different lengths, wherein the mounting bracket comprises a base, a first rail that extends from the first support member to the second support member, a second rail that extends from the third support member to the fourth support member, and an opening in the second rail that routes cables through the bracket;
a compliant member positioned within the bracket that receives a computer component and that rests on the first and second rails, wherein the first and second rails suspend the compliant member over the base of the mounting bracket to provide an air space between the computer component and the base, wherein the computer component comprises top and bottom surfaces and four sidewall surfaces, and wherein the compliant member comprises a first pair of connector strips that extend parallel to two of the sidewall surfaces and a second pair of connector strips that extend parallel to the top and bottom surfaces while leaving two of the sidewall surfaces uncovered;
a first lid attached to the first and second support members such that the computer component is interposed between the first rail and the first lid; and
a second lid attached to the third and fourth support members such that the computer component is interposed between the second rail and the second lid, wherein the first and second lids overlap the two uncovered sidewall surfaces of the computer component.

13. The computing device of claim 12, wherein the mounting bracket is mounted at an angle relative to the curved interior surface.

14. The computing device of claim 12, wherein the computer component is a hard drive.

15. The computing device of claim 12, wherein the compliant member includes a plurality of rib structures that contact the computer component and maintain a gap between the computer component and the first and second pairs of connector strips.

16. The computing device of claim 12, wherein the compliant member comprises an elastomeric sleeve.

17. An assembly for mounting a computer component, the assembly comprising:
a compliant member that wraps around the computer component, wherein the compliant member comprises four corner portions and first and second pairs of opposing side portions that extend between the four corner portions; and
a bracket that engages the compliant member to secure the compliant member to the bracket at each of the four corners, wherein the bracket encloses the first pair of opposing side portions while exposing the second pair of opposing side portions, and wherein the bracket comprises a base defining a curved surface that faces the computer component and provides airflow through a gap between the curved surface and the computer component.

18. The assembly of claim 17, wherein the curved surface increases a velocity of the airflow through the gap.

19. The assembly of claim 17, wherein the airflow cools the computer component.

20. The assembly of claim 17, wherein the curved surface comprises:
a first curved portion;
a second curved portion; and
a substantially flat portion extending between the first and second curved portions.

21. The assembly of claim 20, wherein at least one of the first and second curved portions is configured to direct airflow from a fan into the gap.

22. The assembly of claim 17, wherein the compliant member comprises an encapsulated gel configured to absorb heat generated by the computer component.

* * * * *